United States Patent
Jung et al.

(10) Patent No.: US 10,296,225 B2
(45) Date of Patent: *May 21, 2019

(54) STORAGE CONTROLLER AND METHOD OF OPERATING THE SAME

(71) Applicant: SAMSUNG ELECTRONICS CO., LTD., Suwon-si, Gyeonggi-do (KR)

(72) Inventors: Myung-June Jung, Suwon-si (KR); Ju-Pyung Lee, Suwon-si (KR); Gae-Won You, Seoul (KR); Hoshik Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,883

(22) Filed: May 11, 2018

(65) Prior Publication Data

US 2018/0260117 A1    Sep. 13, 2018

Related U.S. Application Data

(63) Continuation of application No. 14/713,075, filed on May 15, 2015, now Pat. No. 9,996,271.

(30) Foreign Application Priority Data

May 20, 2014    (KR) .................. 10-2014-0060411

(51) Int. Cl.
*G06F 12/00*    (2006.01)
*G06F 13/00*    (2006.01)
(Continued)

(52) U.S. Cl.
CPC ............ *G06F 3/061* (2013.01); *G06F 3/0656* (2013.01); *G06F 3/0659* (2013.01);
(Continued)

(58) Field of Classification Search
CPC ................ G06F 3/0656; G06F 2212/6022
(Continued)

(56) References Cited

U.S. PATENT DOCUMENTS 7,076,619 B2    7/2006    Hsu et al.
7,496,592 B2    2/2009    Chi et al.
(Continued)

FOREIGN PATENT DOCUMENTS

CN    102142992 A    8/2011
JP    2008-269015    11/2006

OTHER PUBLICATIONS

Liu, Li et al., "Optimization of Frequent Itemset Mining on Multiple-Core Processor", 2007, https://pdfs. semanticscholarorg/ 462cife26029b198cad63dda38c6f6a2c7898d85c.pdf, pgs. 1275-1285. X.

(Continued)

*Primary Examiner* — Edward J Dudek, Jr.
*Assistant Examiner* — Sidney Li
(74) *Attorney, Agent, or Firm* — Volentine, Whitt & Francos, PLLC

(57) ABSTRACT

A storage controller includes a co-access pattern mining unit configured to detect co-access patterns of data co-accessed during a particular time duration and to generate co-access groups including a plurality of pieces of data complying with the co-access patterns. The storage controller further include a co-access group matching unit configured to select a co-access group matched with read-requested data, among the generated co-access groups, and a data placement unit configured to store the data included in the selected co-access group in a pre-fetch buffer.

17 Claims, 20 Drawing Sheets

COACCESS PATTERN (401) = {D1, D2, D5, D8}

(51) Int. Cl.
  *G06F 13/28* (2006.01)
  *G06F 3/06* (2006.01)
  *G06F 12/0866* (2016.01)
  *G06F 12/0862* (2016.01)

(52) U.S. Cl.
  CPC .......... *G06F 3/0688* (2013.01); *G06F 3/0689* (2013.01); *G06F 12/0862* (2013.01); *G06F 12/0866* (2013.01); *G06F 2212/312* (2013.01); *G06F 2212/604* (2013.01); *G06F 2212/6022* (2013.01)

(58) Field of Classification Search
  USPC ........................................................ 711/137
  See application file for complete search history.

(56) References Cited

U.S. PATENT DOCUMENTS

| | | | |
|---|---|---|---|
| 7,953,940 | B2 | 5/2011 | Kezuka et al. |
| 8,032,723 | B2 | 10/2011 | Sechrest et al. |
| 8,214,606 | B2 | 7/2012 | Kezuka et al. |
| 8,316,288 | B2 | 11/2012 | Nowoczynski et al. |
| 2010/0082890 | A1* | 4/2010 | Heo .................. G06F 12/0246 711/103 |
| 2010/0115206 | A1 | 5/2010 | De La Iglesia et al. |
| 2010/0115211 | A1 | 5/2010 | De La Iglesia et al. |
| 2010/0281455 | A1 | 11/2010 | Anand et al. |
| 2011/0184922 | A1 | 7/2011 | Lee |
| 2011/0238923 | A1 | 9/2011 | Hooker et al. |

OTHER PUBLICATIONS

European Search Report in Related Application No. 15168382.8 - 1957, Dated October 5, 2015. 0.

\* cited by examiner

COACCESS PATTERN (401) = {D1, D2, D5, D8}

COACCESS PATTERN (405) = {D1, D2,} ⟶ {D3,D5,D6,D7} with Td=1

FIG. 10

| CGID | CG | SV |
|---|---|---|
| 1 | {A,B,C,G} | 0.31 |
| 2 | {A,B,D,E} | 0.27 |
| 3 | {B,D,F} | 0.32 |
| 4 | {C,D} | 0.38 |
| 5 | {A,B,E,F} | 0.31 |
| 6 | {A,B,C,D,E} | 0.19 |
| 7 | {B,D,F,G} | 0.21 |
| 8 | {C,D,E} | 0.33 |

FIG. 11

| SV | 0.31 | 0.27 | 0.32 | 0.38 | 0.31 | 0.19 | 0.21 | 0.33 |
|---|---|---|---|---|---|---|---|---|
| CGID | 1 | 2 | 3 | 4 | 5 | 6 | 7 | 8 |
| A | 1 | 1 | 0 | 0 | 1 | 1 | 0 | 0 |
| B | 1 | 1 | 1 | 0 | 1 | 1 | 1 | 0 |
| C | 1 | 0 | 0 | 1 | 0 | 1 | 0 | 1 |
| D | 0 | 1 | 1 | 1 | 0 | 1 | 1 | 1 |
| E | 0 | 1 | 0 | 0 | 1 | 1 | 0 | 1 |
| F | 0 | 0 | 1 | 0 | 1 | 0 | 1 | 0 |
| G | 1 | 0 | 0 | 0 | 0 | 0 | 1 | 0 | address

B BIT VECTOR = {11101110}
E BIT VECTOR = {01001101}
MASK VECTOR = {01001100}

FIG. 17

| | VECTOR |
|---|---|
| TOP_VEC[1] | "010001000100100001001" |
| TOP_VEC[2] | "010001000100100001001" |
| TOP_VEC[3] | "010001000100100001001" |
| TOP_VEC[4] | "000101000001000001001" |
| TOP_VEC[5] | "001000010000100010010" |
| TOP_VEC[6] | "010000100001000000000" |
| TOP_VEC[7] | "100000100000100000010" |
| TOP_VEC[8] | "100000100000100000010" |
| TOP_VEC[9] | "001000010000100010010" |
| TOP_VEC[10] | "010000100010010001100" |
| TOP_VEC[11] | "001000010000100010010" |
| TOP_VEC[12] | "001000010000100010010" |

STORAGE CONTROLLER AND METHOD OF OPERATING THE SAME

CROSS-REFERENCE TO RELATED APPLICATION

This is a Continuation of U.S. application Ser. No. 14/713,075, filed May 15, 2015, in which a claim of priority is made to Korean Patent Application No. 10-2014-0060411 filed on May 20, 2014, in the Korean Intellectual Property Office, and all the benefits accruing there from under 35 U.S.C. 119, the contents of which in its entirety are herein incorporated by reference.

BACKGROUND

The inventive concepts described herein relate to storage (memory) controllers and to methods of operating storage controllers.

In inputting and outputting data to/from a storage device, a pre-fetch procedure may be performed in order to reduce an input/output (I/O) time and to improve an I/O performance. For example, when addressed data is accessed from a storage device during an I/O operation, data in the storage device that is adjacent to the addressed data may be pre-fetched and loaded in a memory device (such as a buffer memory). This is done in anticipation of the pre-fetched data being accessed in a subsequent I/O operation due to its close proximity in the storage device to the addressed data. If indeed the pre-fetched data is accessed in a subsequent I/O operation, it can be read relatively quickly since it accessible from the buffer memory without being retrieved from the storage device.

SUMMARY

According to an aspect of the inventive concepts, there is provided a storage controller including a co-access pattern mining unit detecting co-access patterns of data co-accessed during a particular time duration and generating co-access groups including a plurality of pieces of data complying with the co-access patterns, a co-access group matching unit selecting a co-access group matched with read-requested data, among the generated co-access groups, and a data placement unit storing the data included in the selected co-access group in a pre-fetch buffer.

According to another aspect of the inventive concepts, there is provided a storage controller including a co-access pattern mining unit detecting co-access patterns of data co-accessed during a particular time duration and generating co-access groups including a plurality of pieces of data complying with the co-access patterns, and a co-access group optimizing unit performing optimization for reducing the number of the generated co-access groups.

According to still another aspect of the inventive concepts, there is provided a method of operating a storage controller, the method including detecting co-access patterns of data co-accessed during a particular time duration, generating co-access groups including a plurality of pieces of data complying with the co-access patterns, selecting a co-access group matched with read-requested data, among the generated co-access groups, and storing the data included in the selected co-access group in a pre-fetch buffer.

BRIEF DESCRIPTION OF THE DRAWINGS

The above and other aspects and features of the inventive concepts will become apparent from the detailed description that follows with reference to the accompanying drawings, in which:

FIGS. 10 and 11 are schematic diagrams for reference for explaining an embodiment illustrating co-access patterns that are matched by an operation method of a storage controller according to an embodiment of the inventive concepts;

FIG. 17 is a schematic diagram for reference in explaining a clustering operation performed using a TOP vector array;

DETAILED DESCRIPTION OF THE EMBODIMENTS

Figure 1:
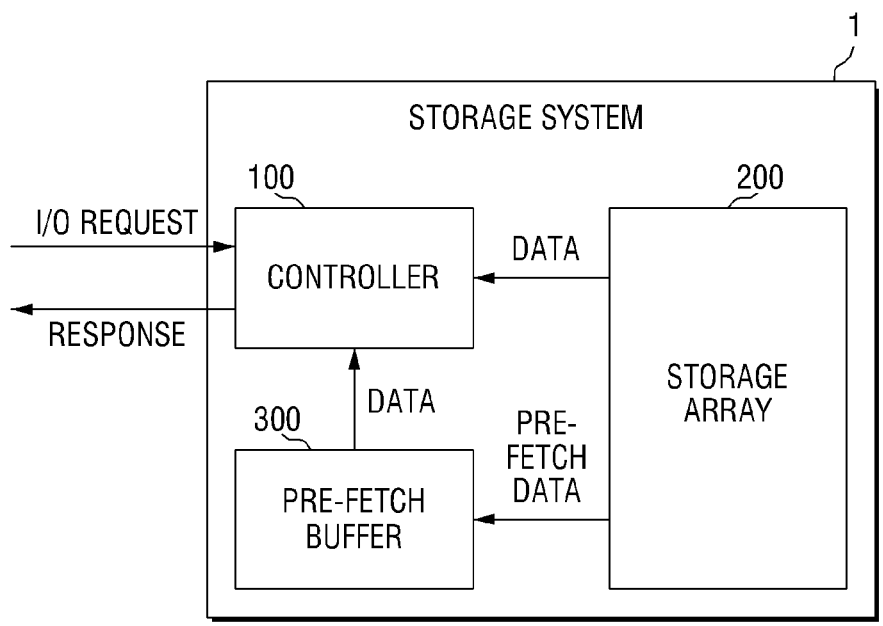
FIG. 1 is a schematic diagram for reference in explaining a storage system according to an embodiment of the inventive concepts.

Aspects and features of the inventive concepts and methods of accomplishing the same will be understood by reference to the following detailed description of preferred embodiments and the accompanying drawings. The inventive concepts may, however, be embodied in many different forms and should not be construed as being limited to the embodiments set forth herein. Rather, these embodiments are provided so that this disclosure will be thorough and complete and will fully convey the inventive concepts to those skilled in the art, and the inventive concepts are to be defined by the appended claims rather than the disclosed embodiments. Like reference numerals refer to like elements throughout the disclosure.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising, " when used in this specification, specify the presence of stated features, integers, steps, operations, elements, and/or components, but do not preclude the presence or addition of one or more other features, integers, steps, operations, elements, components, and/or groups thereof It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As is traditional in the field of the inventive concepts, embodiments are described and illustrated in terms of functional blocks and units. Those skilled in the field of the inventive concepts will understand that these blocks and units are physically implemented by electronic circuits such as logic circuits and the like, which may be driven by firmware and/or software. Also, each functional block and unit of the embodiments may be physically separated into two or more interacting and discrete blocks or units. Further, the functional blocks and units of the embodiments may be physically combined into more complex blocks or units without departing from the scope of the inventive concepts.

FIG. 1 is a schematic diagram for reference in explaining a storage system according to an embodiment of the inventive concepts.

Referring to FIG. 1, a storage system 1 according to an embodiment of the inventive concepts includes a storage controller 100, a storage array 200 and a pre-fetch buffer 300.

The storage controller 100 generally controls an operation of the storage system 1 and performs data I/O operations according to I/O requests received from a host system. For example, in response to an I/O request received from a host system to read data, the storage controller 100 may read data stored in the storage system 1, and transmit the read data in a response to the host system. In response to an I/O request received from a host system to write data, the storage controller 100 may store data received from the host system in the storage system 1.

The storage array 200 stores data. In some embodiments of the inventive concepts, the storage array 200 may include one or more storage devices. For example, the storage array 200 may include at least one of a hard disk drive (HDD) and a solid state drive (SSD). The one or more storage devices may be electrically connected to each other, constituting a storage array.

The pre-fetch buffer 300 functions as a buffer between the storage controller 100 and the storage array 200. In detail, the pre-fetch buffer 300 may store various commands or parameters input through the storage controller 100. In addition, the pre-fetch buffer 300 may store data input/output to/from the storage array 200, parameters and variables. In some embodiments of the inventive concepts, in order to read the read-requested data, the storage controller 100 may search the pre-fetch buffer 300. If the read-requested data exists in the pre-fetch buffer 300, the storage controller 100 may retrieve the data from the pre-fetch buffer 300 to transmit a response to the read request.

Alternatively, if the read-requested data does not exist in the pre-fetch buffer 300, the storage controller 100 may search the storage array 200 and may retrieve the data from the storage array 200 to transmit a response to the read request. In some embodiments of the inventive concepts, an I/O rate (i.e., a write/read operational speed) of the pre-fetch buffer 300 may be higher than that of the storage array 200. In addition, in some embodiments of the inventive concepts, the pre-fetch buffer 300 may include a volatile memory, such as a dynamic random access memory (DRAM), a static random access memory (SRAM) or a double data rate synchronous DRAM (DDR SDRAM), or a nonvolatile memory, such as a flash memory.

Figure 2:
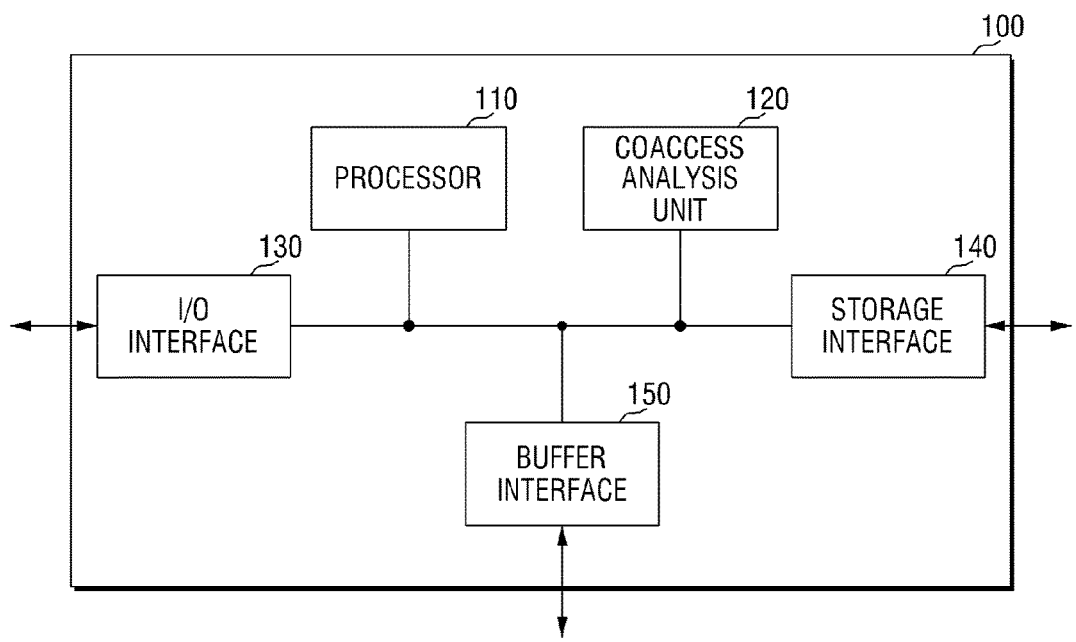
FIG. 2 is a schematic diagram for reference in explaining a storage controller according to an embodiment of the inventive concepts.

FIG. 2 is a schematic diagram for reference in explaining a storage controller according to an embodiment of the inventive concepts.

Referring to FIG. 2, a storage controller 100 according to an embodiment of the inventive concepts includes a processor 110, a co-access analysis unit 120, an I/O interface 130, a storage interface 140 and a buffer interface 150.

The processor 110 may be implemented by circuits, logic devices, software/firmware code or combinations thereof and generally controls the operation of the storage system 1 including the storage controller 100. If power is applied to the storage system 1, the processor 110 drives software for operating the storage system 1, e.g., firmware, thereby controlling the overall operation of the storage system 1. In addition, the processor 110 may interpret commands received through the I/O interface 130 and may control the overall operation of the storage array 200. In addition, the processor 110 may map a logical address of data to a physical address using an address mapping table.

The co-access analysis unit 120 analyzes co-access patterns of data co-accessed during a particular time duration. In addition, the co-access analysis unit 120 detects the data co-accessed during the particular time duration (e.g., 1 second) and generates co-access groups including the data.

When there is a read request for one piece of data among the co-access groups, the co-access analysis unit 120 stores other data constituting the co-access group with the read-requested data in the pre-fetch buffer 300. In other words, the co-access analysis unit 120 estimates that there will be a read request for the other data constituting the co-access group with the read-requested data and performs a pre-fetch operation. In some embodiments of the inventive concepts, the co-access analysis unit 120 may be implemented not only in hardware but in software. For example, the co-access analysis unit 120 may be implemented in hardware, including a field programmable gate array (FPGA), an application specific integrated circuit (ASIC), and a general-purpose computing on graphics processing unit (GPGPU).

As another example, the co-access analysis unit 120 may be implemented in software, including firmware driven on the storage controller 100 and a user application driven on the host system.

The I/O interface 130 may perform interfacing between the storage system 1 including the storage controller 100 and the host system. In particular, the I/O interface 130 may receive a read request from the host system to provide the received read request to the processor 110, and may transmit a response to the read request to the host system. In some embodiments of the inventive concepts, the I/O interface 130 may transmit/receive data to/from the host system in accordance with a predetermined protocol. For example, the predetermined protocol may be a universal serial bus (USB), a small computer system interface (SCSI), a PCI express, ATA, parallel ATA (PATA), serial ATA (SATA), serial attached SCSI (SAS), PCI express (PCIe), and so on, but not limited thereto.

The storage interface 140 may transmit/receive data between the storage controller 100 and the storage array 200. The commands required by the processor 110 may be provided to the storage array 200 through the storage interface 140, and the data may be transmitted from the storage controller 100 to the storage array 200. In addition, the data output from the storage array 200 may be provided to the storage controller 100 through the storage interface 140.

The buffer interface 150 may transmit/receive data between the storage controller 100 and the pre-fetch buffer 300. The commands required by the processor 110 may be provide to the pre-fetch buffer 300 through the buffer interface 150. In addition, the data may be transmitted from the storage controller 100 to the pre-fetch buffer 300. Further, the data output from the pre-fetch buffer 300 may be provided to the storage controller 100 through the buffer interface 150.

In some embodiments of the inventive concepts, the processor 110, the co-access analysis unit 120, the I/O interface 130, the storage interface 140 and the buffer interface 150 may be electrically connected to each other through a system bus.

Figure 3:
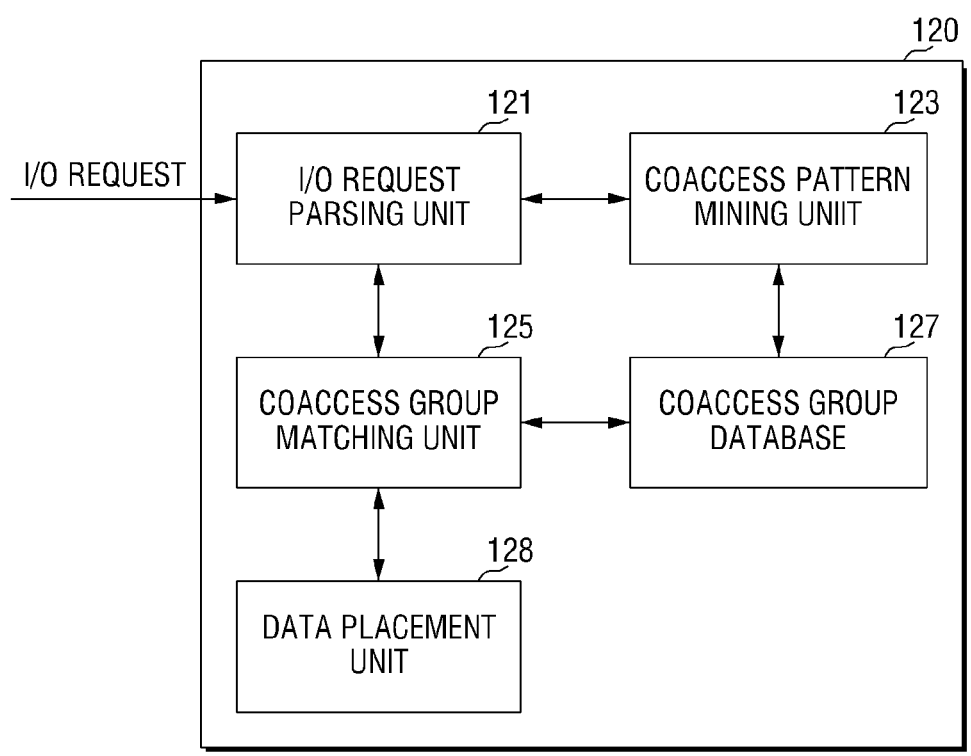
FIG. 3 is a schematic diagram for reference in explaining a co-access analysis unit shown in FIG. 2.

FIG. 3 is a schematic diagram for reference in explaining a co-access analysis unit shown in FIG. 2.

Referring to FIG. 3, the co-access analysis unit 120 shown in FIG. 2 may include an I/O request parsing unit 121, a co-access pattern mining unit 123, a co-access group matching unit 125, a co-access group database 127 and a data placement unit 128.

The I/O request parsing unit 121 may parse the I/O requests received through the I/O interface 130 and may provide the parsed I/O requests to the co-access pattern mining unit 123 or the co-access group matching unit 125. For example, the I/O request parsing unit 121 may receive streams of the I/O requests through the I/O interface 130. The I/O request parsing unit 121 may discriminate the I/O requests included in each of the streams of the I/O requests. In some embodiments of the inventive concepts, the I/O request parsing unit 121 may provide information on timing points at which the discriminated I/O requests are generated with the discriminated I/O requests and addresses of data associated with the discriminated I/O requests to the co-access pattern mining unit 123, thereby allowing the co-access pattern mining unit 123 to detect a co-access pattern.

Meanwhile, in some embodiments of the inventive concepts, the I/O request parsing unit 121 may provide the discriminated I/O requests to the co-access group matching unit 125, thereby allowing the co-access group matching unit 125 to match the co-access groups with the data associated with the discriminated I/O requests.

The co-access pattern mining unit 123 may detect co-access patterns of data co-accessed during a particular time duration and may generate co-access groups including a plurality of pieces of data complying with the co-access patterns.

In detail, the co-access pattern mining unit 123 may detect the data repeatedly co-accessed with the passage of time based on the particular time duration (e.g., 1 second) and may recognize the detected data as the co-access patterns. Thereafter, the co-access pattern mining unit 123 may generate the co-access groups including the plurality of pieces of data forming the detected co-access patterns.

In some embodiments of the inventive concepts, a pre-determined time window may be defined in the I/O request streams in which many I/O requests are generated with passage of time, and the plurality of pieces of data of the co-access groups are included in the time window to then be co-accessed. A process of determining the co-access patterns and co-access groups will later be described in detail with reference to FIGS. 4, 5 and 7.

Meanwhile, in some embodiments of the inventive concepts, in order to generate co-access groups, the co-access pattern mining unit 123 may use a frequent itemset mining algorithm. For example, the co-access pattern mining unit 123 may use Elcat algorithm, Apriori algorithm, or FP-growth algorithm as the frequent itemset mining algorithm.

The co-access group matching unit 125 may select a co-access group matched with the read-requested data among the co-access groups generated by the co-access pattern mining unit 123. That is to say, the co-access group matching unit 125 matches the data associated with the I/O request (e.g., a read request) received from the I/O request parsing unit 121 with the co-access groups generated by the co-access pattern mining unit 123. In some embodiments of the inventive concepts, the co-access group database 127 may store the co-access groups generated by the co-access pattern mining unit 123 and may provide the stored co-access groups to the co-access group matching unit 125.

The data placement unit 128 may read the data included in the co-access group selected by the co-access group matching unit 125, that is, the data co-accessed with the read-requested data in the time window, from the storage array 200 and may store the read data in the pre-fetch buffer 300.

Figure 4:
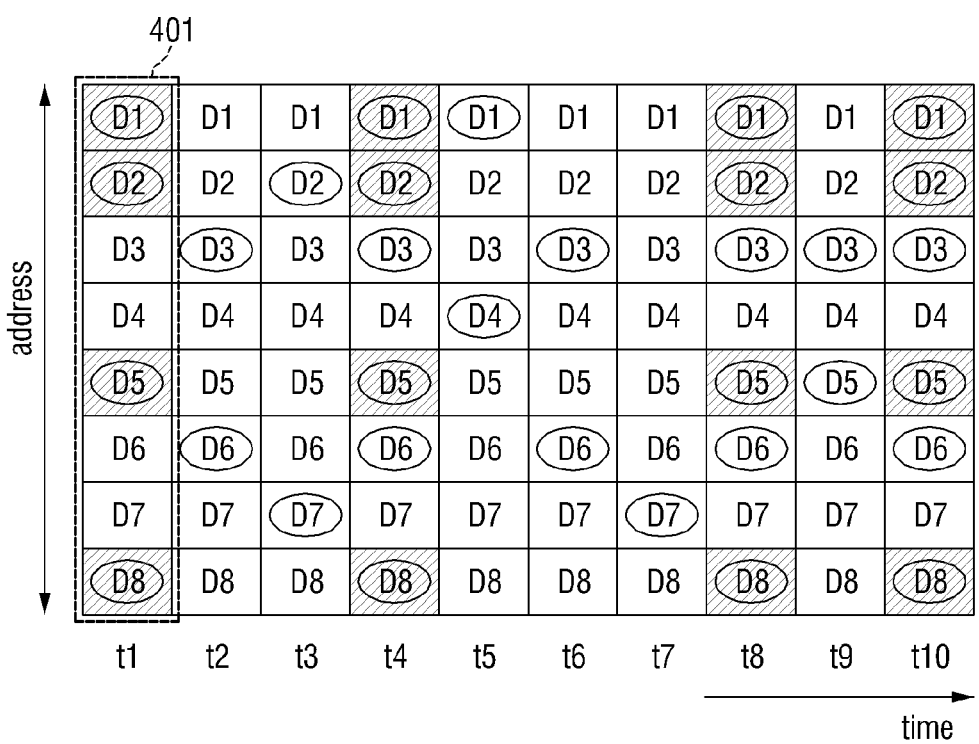
FIGS. 4 and 5 are schematic diagrams for explaining an embodiment in which co-access patterns of data are detected.
Figure 5:
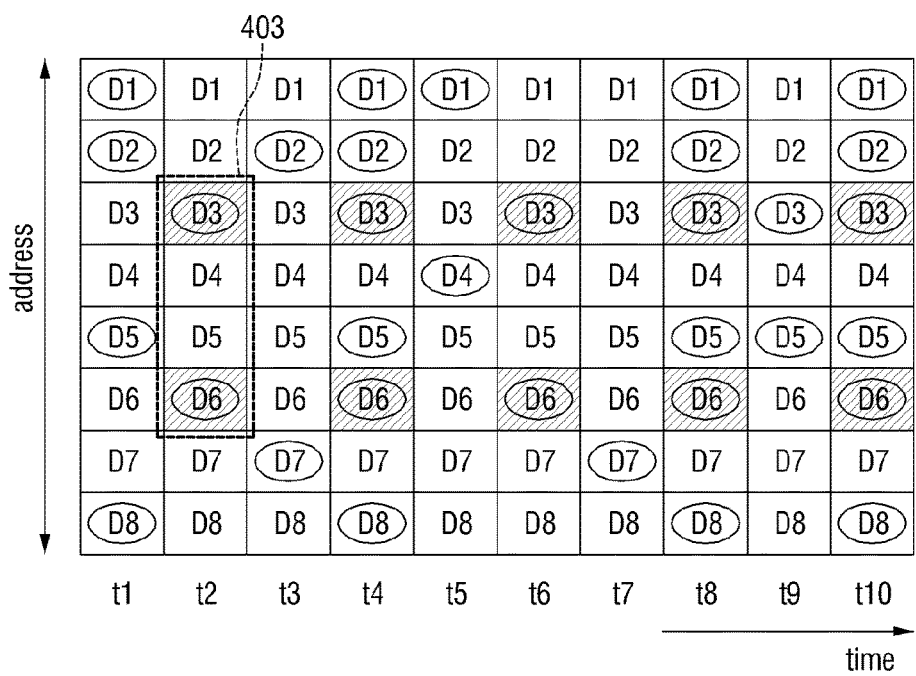

FIGS. 4 and 5 are schematic diagrams for explaining an embodiment in which co-access patterns of data are detected.

Referring to FIG. 4, data D1 to D8 shown in FIG. 4 may represent data associated with I/O requests (i.e., a read request) or addresses thereof. In the present embodiment, data-read requests have occurred 10 times with passage of time, and the data accessed according to the read requests are marked with circles. For example, the data accessed in a time duration t1 include data D1, D2, D5 and D8, the data accessed in a time duration t2 include data D3 and D6, and the data accessed in a time duration t3 include D2 and D7. Lengths of time durations t1 to t10 may be arbitrarily set by operations of the storage controller 100 according to various embodiments of the inventive concepts.

The co-access pattern mining unit 123 detects a co-access pattern 401 of the data co-accessed in the respective time durations t1 to t10. For example, since the data D1, D2, D5 and D8 are co-accessed in the time duration t1 and the data D1, D2, D3, D5, D6 and D8 are co-accessed in the time durations t4, t8 and t10, the co-access pattern mining unit 123 may detect "{D1, D2, D5, D8}" as the co-access pattern 401. As described above, the detecting of the co-access pattern 401 may be performed on the assumption that when one data (e.g., D1) among the data D1, D2, D5 and D8 constituting one co-access pattern 401 is accessed, there is a very high probability of accessing the other data D2, D5 and D8 as well. Thereafter, the co-access pattern mining unit 123 generates co-access groups including a plurality of pieces of data complying with the co-access pattern 401. In some embodiments of the inventive concepts, the co-access groups may include addresses of the plurality of pieces of data complying with the co-access pattern 401.

Similarly, referring to FIG. 5, since the data D3 and D6 are co-accessed in the time durations t2 and t6 and the data D1, D2, D3, D5, D6 and D8 are co-accessed in the time durations t4, t8 and t10, the co-access pattern mining unit 123 may detect "{D3, D6}" as a co-access pattern 403. Thereafter, the co-access pattern mining unit 123 may generate co-access groups including a plurality of pieces of data complying with the co-access pattern 403.

Figure 6:
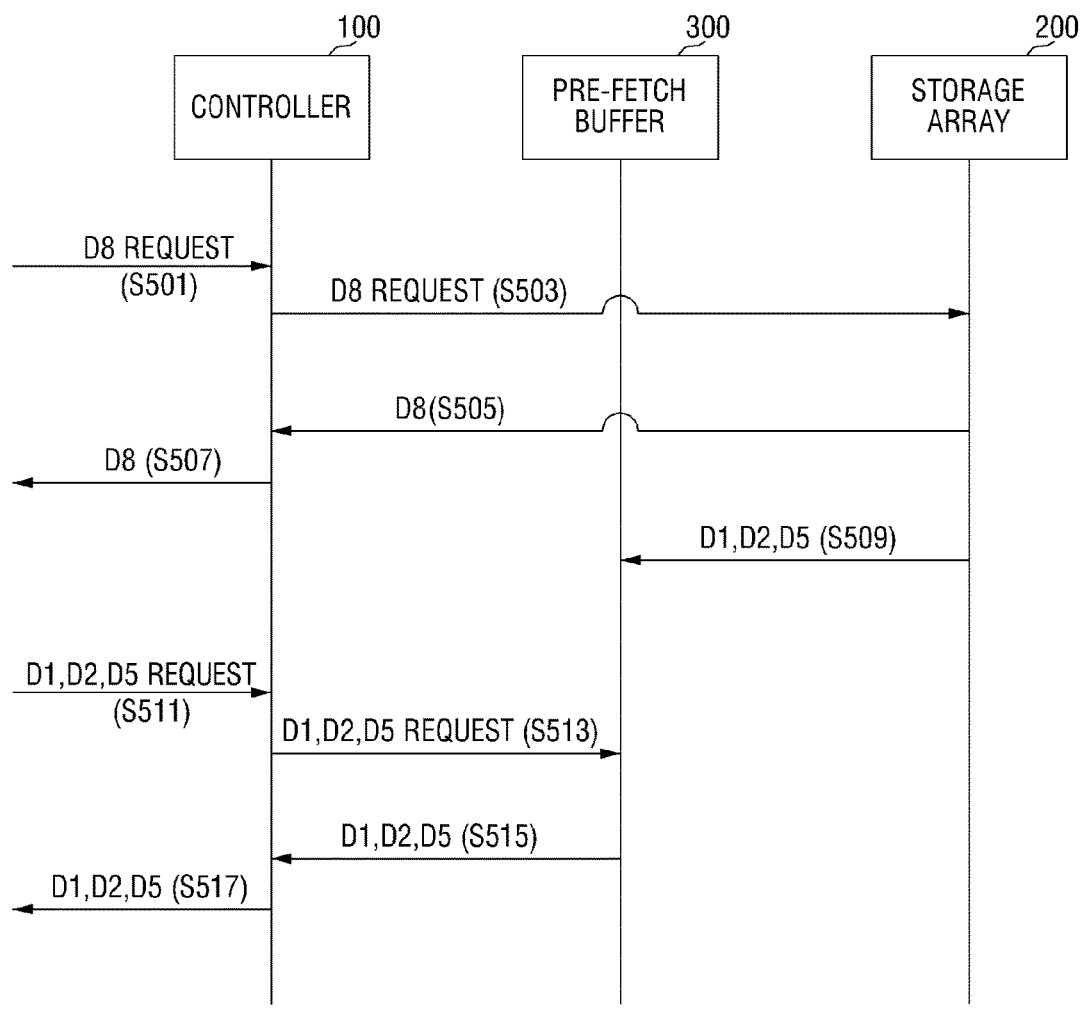
FIG. 6 is a schematic diagram for reference in explaining an operation of a storage controller according to the embodiment shown in FIG. 4.

FIG. 6 is a schematic diagram for reference in explaining an operation of a storage controller according to the embodiment shown in FIG. 4.

FIG. 6 illustrates a case where co-access groups complying with "{D1, D2, D5, D8}" as the co-access pattern 401 shown in FIG. 4 are generated. In the present embodiment, after receiving a read request for data D8 (S501), the storage controller 100 transmits the read request to the storage array 200 (S503). If the storage array 200 reads the data D8 according to the read request to then transmit the read data D8 to the storage controller 100 (S505), the storage controller 100 transmits the data D8 as a response to the read request to, for example, a host system (S507).

Meanwhile, the co-access group matching unit 125 selects a co-access group matched with the data D8, that is, a co-access group complying with "{D1, D2, D5, D8}" as the co-access pattern 401, among the co-access groups generated by the co-access pattern mining unit 123. In some embodiments of the inventive concepts, the co-access group matching unit 125 may search the co-access group database 127 to then select the co-access group matched with the data D8. Thereafter, the data placement unit 128 stores the data D1, D2 and D5 included in the selected co-access group in the pre-fetch buffer 300 (S509). In some embodiments of the inventive concepts, the storing of the data D1, D2 and D5 in the pre-fetch buffer 300 (S509) may be performed after transmitting the data D8 as the response to the read request (S507).

Thereafter, if the storage controller 100 receives a read request for the data D1, D2 and D5 (S511), the storage controller 100 searches the pre-fetch buffer 300 (S513). Since the read-requested data D1, D2 and D5 exist in the pre-fetch buffer 300, the storage controller 100 reads the data D1, D2 and D5 stored in the pre-fetch buffer 300 (S515), the data D1, D2 and D5 are transmitted to, for example, a host system, as a response to the read request (S517).

Figure 7:
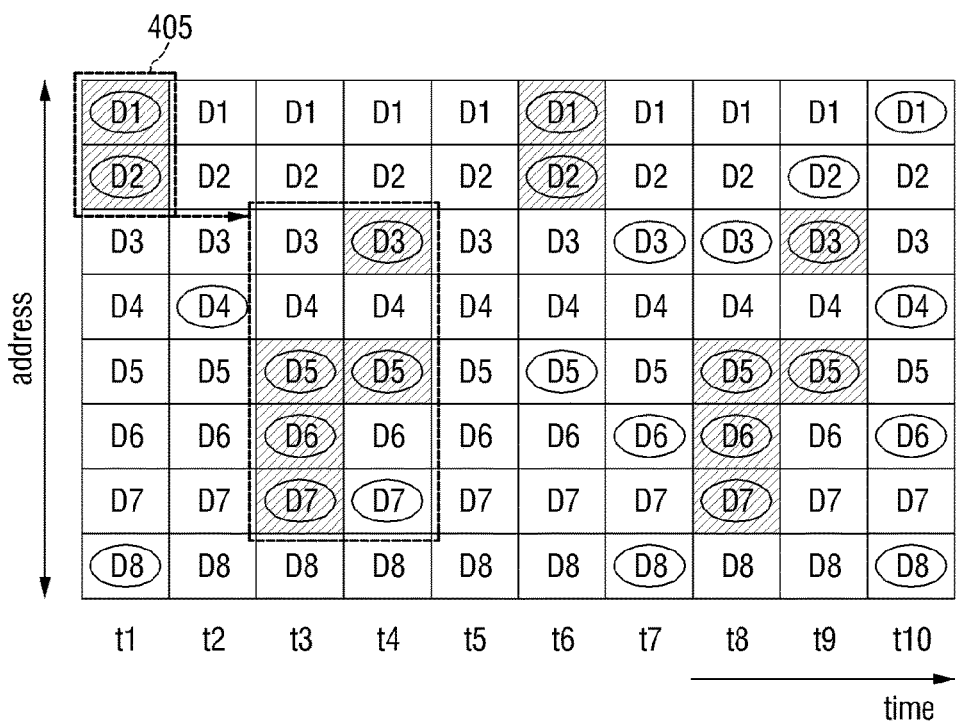
FIG. 7 is a schematic diagram for reference in explaining another embodiment in which co-access patterns of data are detected.

FIG. 7 is a schematic diagram for reference in explaining another embodiment in which co-access patterns of data are detected.

Referring to FIG. 7, the co-access pattern mining unit 123 detects a co-access pattern 405 of data co-accessed in time durations t1 to t10. In the present embodiment, after data D1 and D2 are accessed in the time duration t1, data D3, D5, D6 and D7 are co-accessed in the time durations t3 and t4. Meanwhile, after the data D1, D2 and D5 are accessed in the time duration t6, the data D2, D3, D5, D6 and D7 are co-accessed in the time durations t8 and t9. Then, after reading the data D1 and D2, the co-access pattern mining unit 123 may detect patterns from which the data D3, D5, D6 and D7 are detected with a time difference Td (e.g., 1 second).

That is to say, the co-access patterns may include a first co-access sub pattern of the data (that is, "{D1, D2}") co-accessed in the first time duration (i.e., "t1") during a particular time duration, and a second co-access sub pattern of the data (that is, "{D3, D5, D6, D7}") co-accessed in the second time duration (i.e., "t2") during the particular time duration, and the first co-access sub pattern and the second co-access sub pattern may be accessed with a time difference Td. Thereafter, when there are read requests for the data complying with the first co-access sub pattern (that is, data D1 and D2), the data placement unit 128 may store the data complying with the second co-access sub pattern (that is, data D3, D5, D6 and D7) in the pre-fetch buffer 300. In particular, the data placement unit 128 may store data complying with the second co-access sub pattern (that is, data D3, D5, D6 and D7) in the pre-fetch buffer 300 within the time difference Td.

Figure 8:
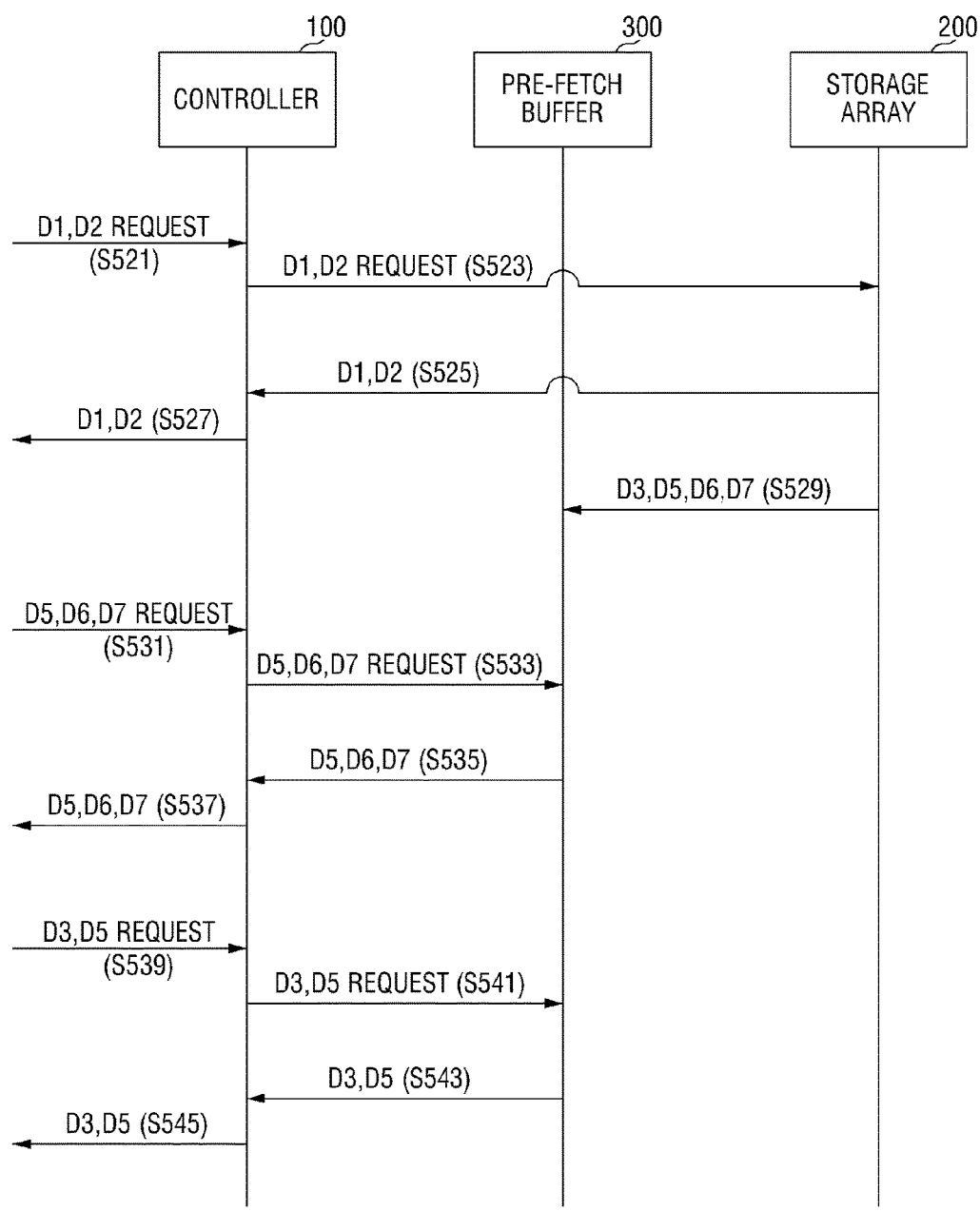
FIG. 8 is a schematic diagram for reference in explaining an operation of a storage controller according to the embodiment shown in FIG. 7.

FIG. 8 is a schematic diagram for reference in explaining an operation of a storage controller according to the embodiment shown in FIG. 7.

FIG. 8 illustrates an example where co-access groups complying with the co-access pattern 405 shown in FIG. 7 are generated. In the present embodiment, after the storage controller 100 receives a read request for the data D1 and D2 (S521), the read request is transmitted to the storage array 200 (S523). If the storage array 200 reads the data D1 and D2 according to the read request to transmit the read data D1 and D2 to the storage controller 100 (S525), the storage controller 100 transmits the data D1 and D2 to, for example, a host system, as a response to the read request (S527).

Meanwhile, the co-access group matching unit 125 selects a co-access group matched with the first co-access sub pattern (that is, "{D1, D2}"), that is, a co-access group complying with the second co-access sub pattern (that is, "{D3, D5, D6, D7}"), among the co-access groups generated by the co-access pattern mining unit 123. Thereafter, the data placement unit 128 stores the data D3, D5, D6 and D7 included in the selected co-access group in the pre-fetch buffer 300 (S529).

Thereafter, if the storage controller 100 receives the read request for the data D5, D6 and D7 (S531), the storage controller 100 searches the pre-fetch buffer 300 (S533). Since the read-requested data D5, D6 and D7 exist in the pre-fetch buffer 300, the storage controller 100 reads the data D5, D6 and D7 stored in the pre-fetch buffer 300 (D535) and transmits the data D5, D6 and D7 to, for example, the host system, as a response to the read request (S537).

In addition, if the storage controller 100 receives the read request for the data D3 and D5 (S539), the storage controller 100 searches the pre-fetch buffer 300 (S541). Since the read-requested data D3 and D5 also exist in the pre-fetch buffer 300, the storage controller 100 reads the data D3 and D5 stored in the pre-fetch buffer 300 (D543) and transmits the data D3 and D5 to, for example, the host system, as a response to the read request (S545).

Figure 9:
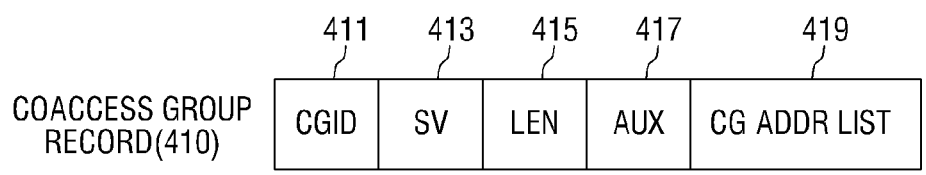
FIG. 9 is a schematic diagram for reference in explaining a co-access group record used by a storage controller according to an embodiment of the inventive concepts.

FIG. 9 is a schematic diagram for reference in explaining a co-access group record used by a storage controller according to an embodiment of the inventive concepts.

As described above, the co-access groups generated by the co-access pattern mining unit 123 may be stored in the co-access group database 127. Referring to FIG. 9, in some embodiments of the inventive concepts, a co-access group record 410 stored in the co-access group database 127 may include a co-access group ID (CGID) 411, a co-access group occurrence frequency (SV) 413, a co-access group length (LEN) 415, an auxiliary field (AUX) 417 and a co-access group address list (CG ADDR LIST) 419. Here, the co-access group occurrence frequency (SV) 413 indicates an occurrence frequency of co-access groups co-accessed per unit time by the I/O request. For example, if the occurrence frequency of a certain co-access group is 0.035, the co-access groups may be generated 35 times during 1000 cycles of I/O operations.

FIGS. 10 and 11 are schematic diagrams for explaining an embodiment illustrating co-access patterns are matched by an operation method of a storage controller according to an embodiment of the inventive concepts.

Referring to FIG. 10, the respective co-access groups may have an occurrence frequency value. For example, a co-access group having a co-access group ID of '1' includes data having addresses 'A', 'B', 'C' and 'G' and has a occurrence frequency value of '0.31'. In addition, a group having a co-access group ID of '2' includes data having addresses 'A', 'B', 'D' and 'E' and has a occurrence frequency value of '0.27'.

Referring to FIG. 11, if for example the co-access groups shown in FIG. 10 are generated, an array of bit vectors may be constituted by addresses of data included in the respective co-access groups as vertical strings and co-access group IDs as horizontal strings. For example, a bit vector for the address 'B' is "{11101110}" and data having an address 'B' is included in the co-access groups having co-access group ID of 1, 2, 3, 5, 6 and 7. In addition, a bit vector for the address 'E' is "{01001101}" and data having an address 'E' is included in the co-access groups having co-access group ID of 2, 5, 6 and 8.

In some embodiments of the inventive concepts, the co-access group matching unit 125 may select a co-access group matched with the read-requested data using bit vectors representing the generated co-access groups (that is, bit vectors for addresses A to G). For example, in a case where there are read requests for the data having the address 'B' and the data having the address 'E', in order to determine the co-access groups matched with the data, an AND operation may be performed on the bit vector "{11101110}" for the address 'B' and the bit vector "{01001101}" for the address 'E'. As a result, a mask vector "{101001100}" can be obtained, suggesting that the co-access groups having co-access group IDs of '2', '5' and '6' are simultaneously matched with the data having the address 'B' and the data having the address 'E'.

However, as described above, when there are a plurality of co-access groups matched with the read-requested data, the co-access group matching unit 125 may select a co-access group occurring most frequently per unit time among the plurality of co-access groups. For example, if co-access groups having co-access group IDs '5' and '6' are matched with the read-requested data, the co-access group having the higher co-access group ID '5' may be selected.

In some embodiments of the inventive concepts, in the event there a plurality of co-access groups occurring most frequently per unit time, the co-access group matching unit 125 may select one co-access group based on a state of the pre-fetch buffer 300. For example, if a proportion of an allowance space to a use space of the pre-fetch buffer 300 is greater than or equal to a predetermined critical value, the co-access group matching unit 125 selects the co-access group having the largest length. For example, as described above, if the co-access groups having co-access group IDs '5' and '6' matched with the read-requested data have the same occurrence frequency, the co-access group having the larger length may be selected. Meanwhile, if the proportion of an allowance space relative to a use space of the pre-fetch buffer 300 is less than the predetermined critical value, the co-access group matching unit 125 selects the co-access group having the smallest length.

Meanwhile, in some embodiments of the inventive concepts, in the event there a plurality of co-access group occurring most frequently per unit time, the co-access group matching unit 125 may select two or more co-access groups. For example, as described above, if the co-access groups having co-access group IDs '5' and '6' matched with the read-requested data have the same occurrence frequency, the co-access group matching unit 125 may select both of the co-access groups. Accordingly, in this example, since the co-access group having the co-access group ID of '5' includes addresses 'A', 'B', 'E' and 'F' and the co-access group having the co-access group ID of '6' includes addresses 'A', 'B', 'C', 'D' and 'E', the data corresponding to the addresses 'A', 'B', 'C', 'D', E' and 'F' may be pre-fetched.

Figure 12:
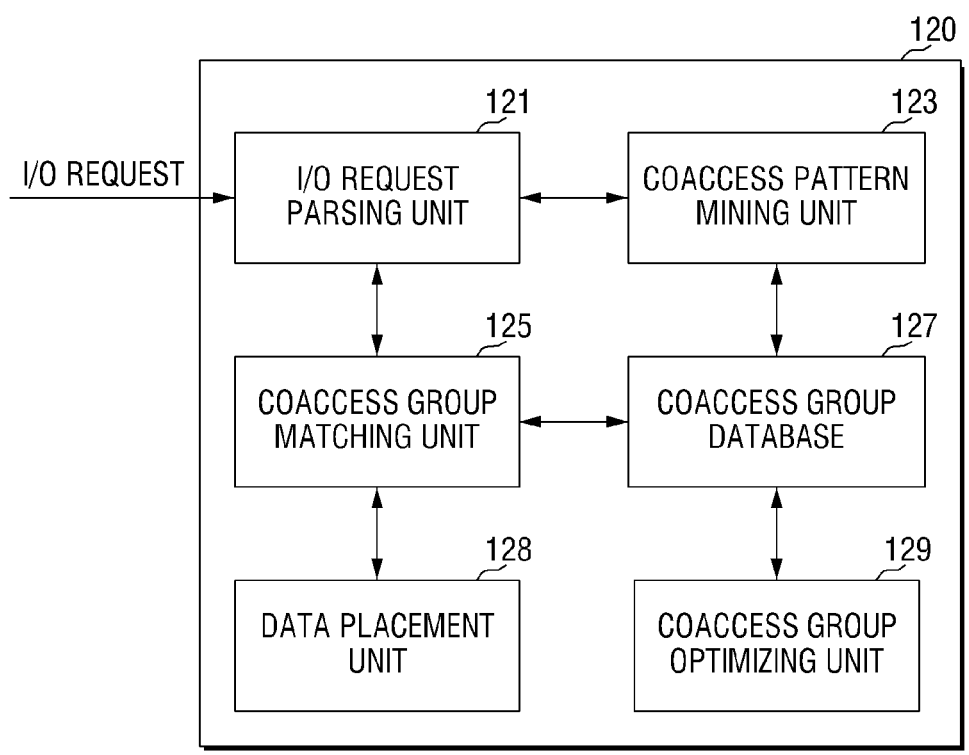
FIG. 12 is a schematic diagram for reference in explaining a co-access analysis unit of a storage controller according to another embodiment of the inventive concepts.
Figure 13:
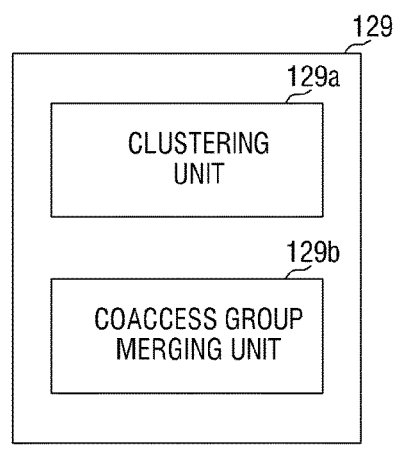
FIG. 13 is a schematic diagram for reference in explaining a co-access group optimizing unit.

FIG. 12 is a schematic diagram for reference in explaining a co-access analysis unit of a storage controller according to another embodiment of the inventive concepts, and FIG. 13 is a schematic diagram for reference in explaining a co-access group optimizing unit.

Referring to FIG. 12, in the storage controller 100 according to another embodiment of the inventive concepts, a co-access analysis unit 120 differs from the co-access analysis unit 120 shown in FIG. 3 in that includes a co-access group optimizing unit 129 in addition to an I/O request parsing unit 121, a co-access pattern mining unit 123, a co-access group matching unit 125 and a co-access group database 127. The co-access group optimizing unit 129 performs optimization for reducing the number of the co-access groups generated by the co-access pattern mining unit 123. In detail, the co-access group optimizing unit 129 analyzes the co-access groups stored in the co-access group database 127 and merges the co-access groups accessed at the same time with passage of time into one co-access group, which will later be described in more detail with reference to FIGS. 14 and 15.

Referring to FIG. 13, the co-access group optimizing unit 129 may include a clustering unit 129a and a co-access group merging unit 129b. The clustering unit 129a clusters co-access groups accessed at the same time and the co-access group merging unit 129b merges the clustered co-access groups into one co-access group.

Figure 14:
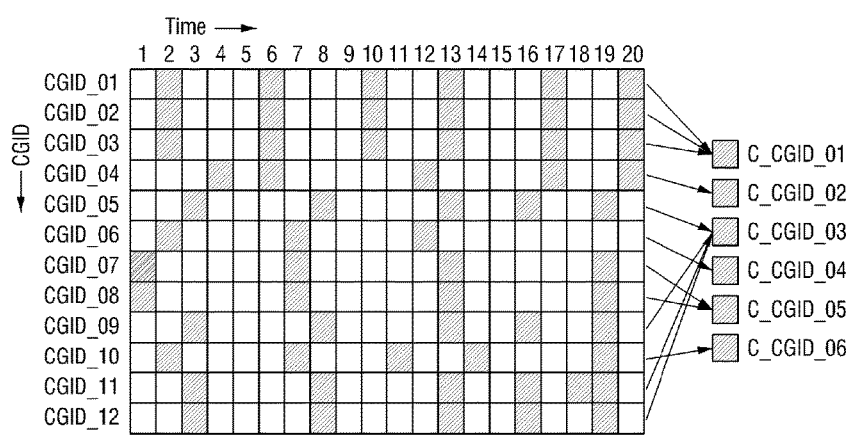
FIGS. 14 and 15 are schematic diagrams for reference in explaining an operation of a co-access group optimizing unit shown in FIG. 12.
Figure 15:
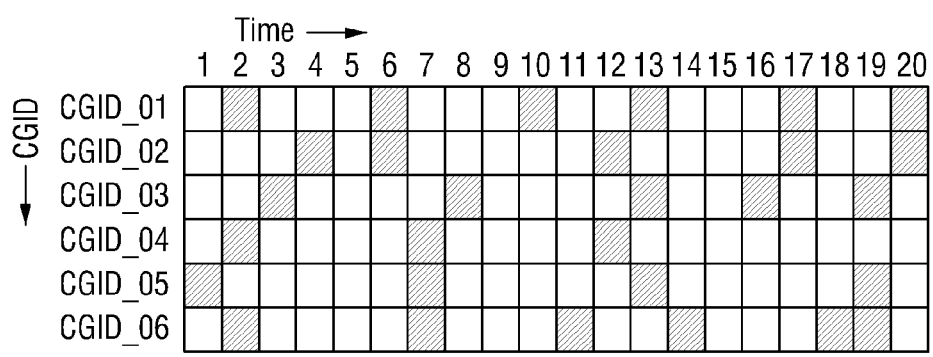

FIGS. 14 and 15 are schematic diagrams for reference in explaining an operation of a co-access group optimizing unit shown in FIG. 12.

FIG. 14 illustrates timing points of accessing 12 co-access groups CGID_01 to CGID_12 with respect to time slots 1 to 20. For example, the co-access groups CGID_01 to CGID_03 are accessed in time slots 2, 6, 10, 13, 17 and 20, and the co-access group CGID_04 is accessed in time slots 4, 6, 12, 17 and 20. As shown in FIG. 14, since 3 co-access groups CGID_01 to CGID_03 are accessed in the same time slots 2, 6, 10, 13, 17 and 20, they may be treated as one co-access group C_CGID_01.

FIG. 15 illustrates a merging result of co-access groups accessed in the same time slot. In detail, the co-access groups CGID_01 to CGID_03 accessed in the time slots 2, 6, 10, 13, 17 and 20 are merged into one co-access group C_CGID_01, the co-access groups CGID_05, CGID_09, CGID_11 and CGID_12 accessed in the time slots 3, 8, 13, 16 and 19 are merged into one co-access group C_CGID_03, and the co-access groups CGID_07 and CGID_08 accessed in the time slots 1, 7, 13 and 19 are merged into one co-access group C_CGID_05.

Figure 16:
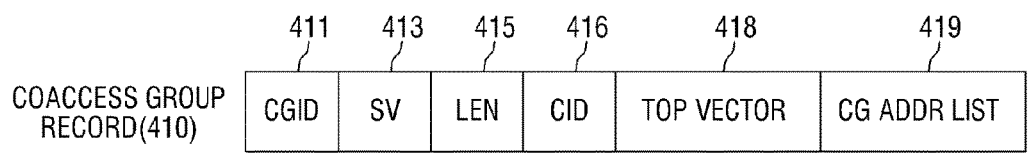
FIG. 16 is a schematic diagram for reference in explaining a co-access group record used by a storage controller according to another embodiment of the inventive concepts.

FIG. 16 is a schematic diagram for reference in explaining a co-access group record used by a storage controller according to another embodiment of the inventive concepts.

The co-access group optimizing unit 129 may perform optimization by analyzing the co-access groups stored in the co-access group database 127 and may store the optimization result in the co-access group database 127. Referring to FIG. 16, in some embodiments of the inventive concepts, the co-access group record 410 stored in the co-access group database 127 may include a co-access group ID (CGID) 411, a co-access group occurrence frequency (SV) 413, and a co-access group length (LEN) 415, a cluster ID (CID) 416, a TOP vector 418, and a co-access group address list (CG ADDR LIST) 419. Here, the cluster ID 416 is an ID assigned to the merged co-access group after being clustered, and the TOP vector 418 is a vector representing a temporal occurrence pattern for the co-access group.

FIG. 17 is a schematic diagram for reference in explaining a clustering operation performed using a TOP vector array.

The clustering unit 129a clusters the co-access groups accessed in the same time duration using the TOP vector 418 representing the temporal occurrence pattern for the generated co-access group. FIG. 17 illustrates TOP vectors TOP_VEC[1] to TOP_VEC[12] for 12 co-access groups CGID_01 to CGID_12 shown in FIG. 14. Referring to FIG. 17, the TOP vector TOP_VEC[1] for the co-access group (CGID_01) is "01000100010010001001" and the TOP vector TOP_VEC[4] for the co-access group CGID_04 is "00010100000100001001", which are produced by binary encoding the temporal occurrence pattern. Accordingly, locations of '1' at the TOP vector TOP_VEC[1] and TOP_VEC[4]) may correspond to the time slots 2, 6, 10, 13, 17 and 20 in each of which the co-access group CGID_01 is accessed and the time slots 4, 6, 12, 17 and 20 in each of which the co-access group CGID_04 is accessed. In this manner, the respective TOP vectors TOP_VEC[1] to TOP_VEC[12] may be generated for all of the 12 co-access groups CGID_01 to CGID_12.

In some embodiments of the inventive concepts, clustering is performed on the generated TOP vectors TOP_VEC[1] to TOP_VEC[12] using a "K-means" algorithm. That is to say, clustering is performed until an optimum K value is found using the generated TOP vectors TOP_VEC[1] to TOP_VEC[12] as input values for the K-means algorithm. As the result, for example, "{6, 6, 6, 5, 4, 3, 2, 2, 4, 1, 4, 4}" as the cluster ID are assigned to the respective TOP vectors TOP_VEC[1] to TOP_VEC[12], respectively, and the TOP vectors TOP_VEC[1] to TOP_VEC[3] may become one cluster having an ID '6'. Eventually, 6 clusters may be generated from 12 TOP vectors TOP_VEC[1] to TOP_VEC[12].

Figure 18:
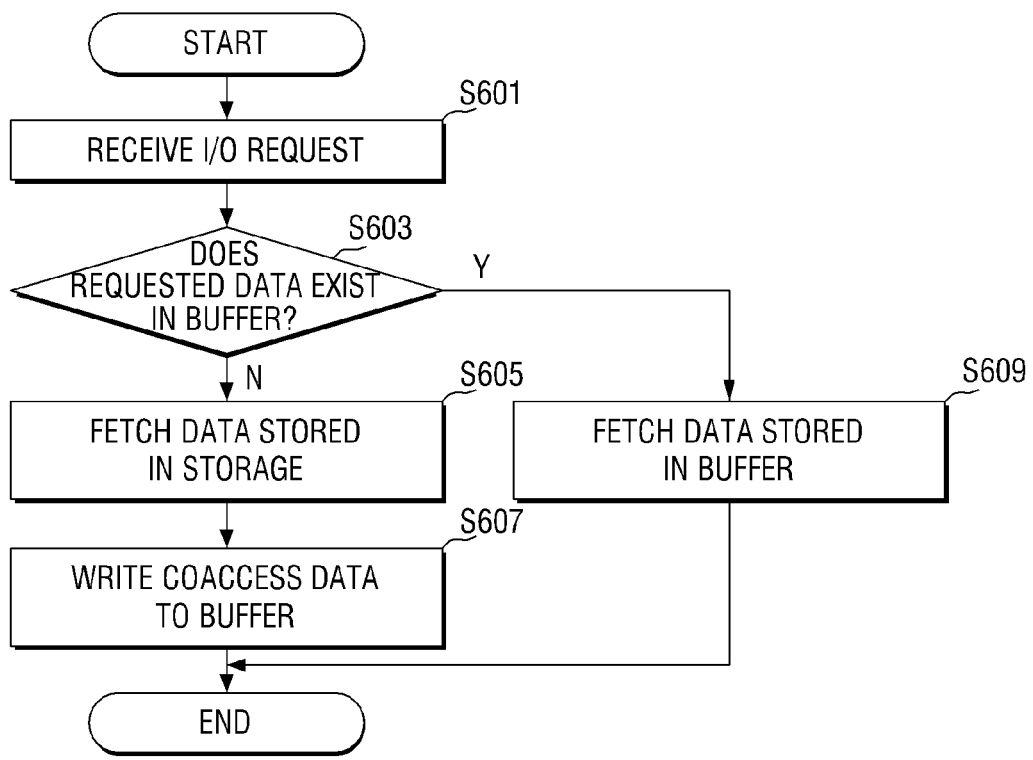
FIG. 18 is a schematic diagram for reference in explaining an operating method of a storage controller according to an embodiment of the inventive concepts.

FIG. 18 is a schematic diagram for reference in explaining an operating method of a storage controller according to an embodiment of the inventive concepts.

Referring to FIG. 18, the operating method of the storage controller according to an embodiment of the inventive concepts includes receiving an I/O request (e.g., a read request) (S601) and then checking whether read-requested data exists in the pre-fetch buffer 300 (S603). If the read-requested data does not exist in the pre-fetch buffer 300, the data stored in the storage array 200 is fetched (S605) and co-accessed data associated with the read-requested data is stored in the pre-fetch buffer 300 (S607). Meanwhile, if the read-requested data exists in the pre-fetch buffer 300, the data stored in the pre-fetch buffer 300 is fetched (S609).

Here, the storing of the co-accessed data associated with the read-requested data in the pre-fetch buffer 300 (S607) may include detecting co-access patterns of data co-accessed during a particular time duration, generating co-access groups including a plurality of pieces of data complying with the co-access patterns, selecting a co-access group matched with read-requested data among the generated co-access groups, and storing the data included in the selected co-access group in the pre-fetch buffer 300.

Figure 19:
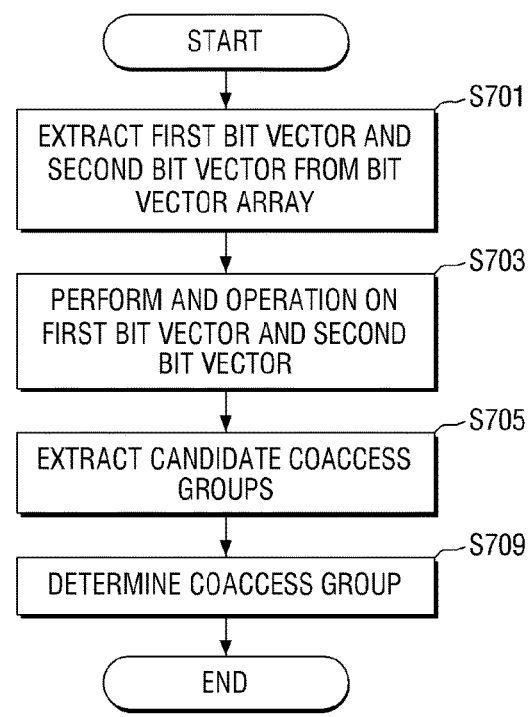
FIG. 19 is a schematic diagram for reference in explaining an operating method of a storage controller according to another embodiment of the inventive concepts.

FIG. 19 is a schematic diagram for reference in explaining an operating method of a storage controller according to another embodiment of the inventive concepts.

Referring to FIG. 19, an operating method of the storage controller according to another embodiment of the inventive concepts includes extracting a first vector bit and a second vector bit from an array of bit vectors constituted by addresses of data included in the respective co-access groups as vertical strings and co-access group IDs as horizontal strings (S701). Next, an AND operation is performed on the first bit vector and the second bit vector (S703) and a candidate co-access group is then extracted (S705). In the event that a plurality of candidate co-access groups are extracted, one co-access group among the plurality of candidate co-access groups is determined (S709). The determining of the co-access group among the plurality of candidate co-access groups (S709) may include selecting the co-access group occurring most frequently per unit time or selecting the co-access group having the largest or smallest length based on a state of the pre-fetch buffer 300, as described above with reference to FIG. 11.

Figure 20:
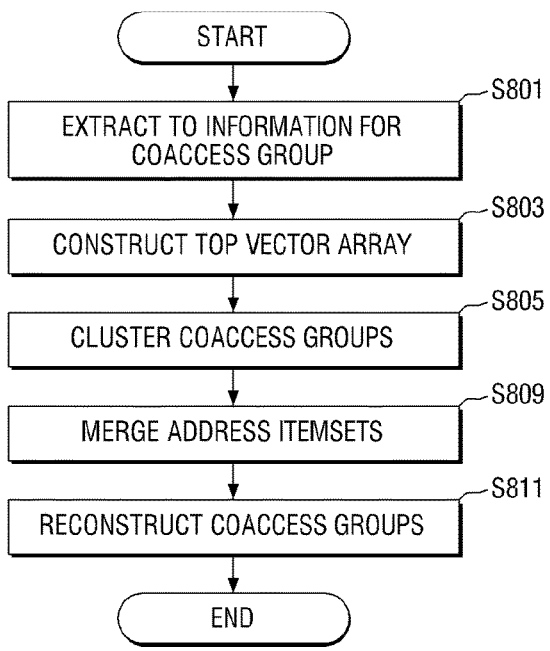
FIG. 20 is a schematic diagram for reference in explaining an operating method of a storage controller according to still another embodiment of the inventive concepts.

FIG. 20 is a schematic diagram for reference in explaining an operating method of a storage controller according to still another embodiment of the inventive concepts.

Referring to FIG. 20, the operating method of the storage controller according to still another embodiment of the inventive concepts includes extracting TOP information for co-access groups (S801) and constructing a TOP vector array (S803). The co-access groups are clustered by applying a cluster algorithm, for example, K-means clustering, on the TOP vector array (S805). Thereafter, address item sets associated with the respectively clustered TOP vectors are merged (S809) to reconstruct the co-access groups (S811).

As described above, according to various embodiments of the inventive concepts, a pre-fetch operation may be performed using co-access group information obtained by analyzing inclination of I/O request streams with the passage of time. Accordingly, the pre-fetch operation can be effective with respect to random I/O operations as well as in sequential I/O operations, thereby ultimately maximizing I/O efficiency. In addition, co-access group database and memory spaces can be saved by clustering the co-access group information while reducing the cost for processing I/O commands.

While the inventive concepts have been particularly shown and described with reference to exemplary embodiments thereof, it will be understood by those of ordinary skill in the art that various changes in form and details may be made therein without departing from the spirit and scope of the inventive concepts as defined by the following claims. It is therefore desired that the embodiments be considered in all respects as illustrative and not restrictive, reference being made to the appended claims rather than the foregoing description to indicate the scope of the inventive concepts.

What is claimed is:

1. A method of operating a storage controller, the method comprising:
   detecting co-access patterns of data co-accessed during each of a plurality of distinct time durations, across the distinct time durations, and independent of a sequence of co-accesses of the data in the distinct time durations;
   generating co-access groups that each include a respective plurality of pieces of data complying with the co-access patterns of data co-accessed during the distinct time durations;
   selecting a co-access group matched with read-requested data, among the generated co-access groups; and
   storing the data included in the selected co-access group in a pre-fetch buffer.

2. The method of claim 1,
   wherein the read-requested data includes first data and second data, and when a plurality of co-access groups include one of the first data and the second data, the selecting of the co-access group matched with the read-requested data comprises selecting co-access data groups that include both of the first data and the second data.

3. The method of claim 1,
   wherein the storing of the data included in the selected co-access group in the pre-fetch buffer is performed after transmitting a response to the read-requested data.

4. The method of claim 1, further comprising:
   when a read request for the data included in the selected co-access group is received, reading the data included in the selected co-access group from the pre-fetch buffer.

5. The method of claim 1,
   wherein the distinct time durations each include a distinct predetermined time window, and
   wherein the data of the co-access groups is co-accessed with the read-requested data in at least one predetermined time window.

6. The method of claim 1, further comprising:
   selecting the co-access group matched with the read-requested data using bit vectors representing the generated co-access groups.

7. The method of claim 1, further comprising:
   when a plurality of co-access groups are matched with the read-requested data, selecting a co-access group corresponding to data co-accessed most frequently per distinct time duration among the plurality of co-access groups.

8. The method of claim 7, further comprising:
   when the plurality of co-access groups correspond to data co-accessed most frequently per distinct time duration, selecting the co-access group based on a state of the pre-fetch buffer.

9. The method of claim 8, further comprising:
   selecting the co-access group having a largest length when a proportion of an allowance space relative to a use space of the pre-fetch buffer is greater than or equal to a predetermined value, and selecting the co-access group having a smallest length when the proportion of the allowance space relative to the use space of the pre-fetch buffer is less than the predetermined value.

10. The method of claim 7, further comprising:
    when the plurality of co-access groups correspond to data co-accessed most frequently per distinct time duration, selecting two or more co-access groups.

11. The method of claim 1, further comprising:
    storing the data included in the selected co-access group; and
    transmitting the data included in the selected co-access group to the pre-fetch buffer.

12. The method of claim 1,
    wherein any of the co-access groups may include more than two items of co-accessed data.

13. The method of claim 12,
    wherein a co-access group record stored in a co-access group database includes identifications (IDs), occurrence frequencies and lengths of the co-access groups, and an address list of data included in the co-access groups.

14. The method of claim 1,
    wherein the co-access pattern includes a first co-access sub pattern of data co-accessed during a first time duration of the distinct time durations, and a second co-access sub pattern of data co-accessed during a second time duration of the distinct time durations, and the first co-access sub pattern and the second co-access sub pattern are accessed with a time difference.

15. The method of claim 14, further comprising:
when a read request for data complying with the first co-access sub pattern is received, storing data complying with the second co-access sub pattern in the pre-fetch buffer.

16. The method of claim 15, further comprising:
storing the data complying with the second co-access sub pattern in the pre-fetch buffer within the time difference.

17. The method of claim 1,
wherein a plurality of first data of the data are accessed during one of the plurality of distinct time durations,
the respective plurality of pieces of data complying with the co-access patterns comprise all or part of the plurality of first data, and
the respective plurality of pieces of data complying with the co-access pattern is repeatedly co-accessed with passage of time based on the distinct time durations, regardless of an order in which each of the plurality of first data is accessed in the distinct time durations.

* * * * *